United States Patent
Lenoski et al.

(10) Patent No.: US 7,069,306 B1
(45) Date of Patent: Jun. 27, 2006

(54) PROVIDING SHARED AND NON-SHARED ACCESS TO MEMORY IN A SYSTEM WITH PLURAL PROCESSOR COHERENCE DOMAINS

(75) Inventors: Daniel E. Lenoski, San Jose, CA (US); Jeffrey S. Kuskin, Mountain View, CA (US); William A. Huffman, Los Gatos, CA (US); Michael S Woodacre, Sutton Benger (GB)

(73) Assignee: Silicon Graphics, Inc., Mountain View, CA (US)

( * ) Notice: Subject to any disclaimer, the term of this patent is extended or adjusted under 35 U.S.C. 154(b) by 808 days.

(21) Appl. No.: 09/910,591

(22) Filed: Jul. 20, 2001

Related U.S. Application Data

(60) Provisional application No. 60/219,950, filed on Jul. 20, 2000.

(51) Int. Cl.
*G06F 15/16* (2006.01)
*G06F 12/08* (2006.01)

(52) U.S. Cl. .................. 709/213; 711/145; 711/119; 711/148

(58) Field of Classification Search ............... 709/213, 709/201; 711/145, 141, 119, 148, 163
See application file for complete search history.

(56) References Cited

U.S. PATENT DOCUMENTS

| | | | | |
|---|---|---|---|---|
| 5,623,628 A | | 4/1997 | Brayton et al. | |
| 5,752,264 A | * | 5/1998 | Blake et al. | 711/144 |
| 6,085,263 A | | 7/2000 | Sharma et al. | |
| 6,209,064 B1 | * | 3/2001 | Weber | 711/141 |
| 6,516,372 B1 | | 2/2003 | Anderson et al. | |
| 2002/0087807 A1 | | 7/2002 | Gharachorloo et al. | |
| 2003/0115422 A1 | | 6/2003 | Spencer et al. | |
| 2003/0120875 A1 | | 6/2003 | Bourne et al. | |
| 2004/0088487 A1 | | 5/2004 | Barroso et al. | |

OTHER PUBLICATIONS

Kien A. Hua et al., "Interconnecting Shared–Everything Systems for Efficient Parallel Query Processing", Proceedings of the Fir International Conference on Parallel and Distributed Information Systems, 1991, pp 262–270.*

Culler, et al. "Parallel Computer Architecture", San Francisco Morgan–Kaufman, cover pages and pp. 553–559; 1998.

* cited by examiner

*Primary Examiner*—Reginald G. Bragdon
(74) *Attorney, Agent, or Firm*—Baker Botts L.L.P.

(57) ABSTRACT

A method and system for managing memory in a multiprocessor system includes defining the plurality of processor coherence domains within a system coherence domain of the multiprocessor system. The processor coherence domains each include a plurality of processors and a processor memory. Shared access to data in the processor memory of each processor coherence domain is provided only to elements of the multiprocessor system within the processor coherence domain. Non-shared access to data in the processor memory of each processor coherence domain is provided to elements of the multiprocessor system within and outside of the processor coherence domain.

29 Claims, 8 Drawing Sheets

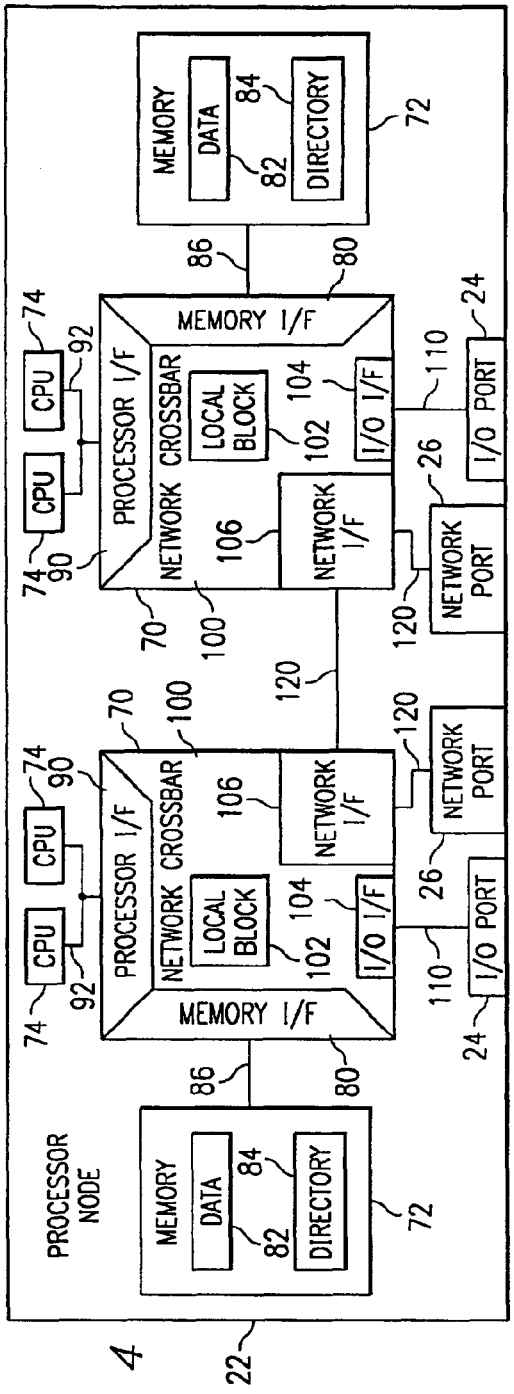
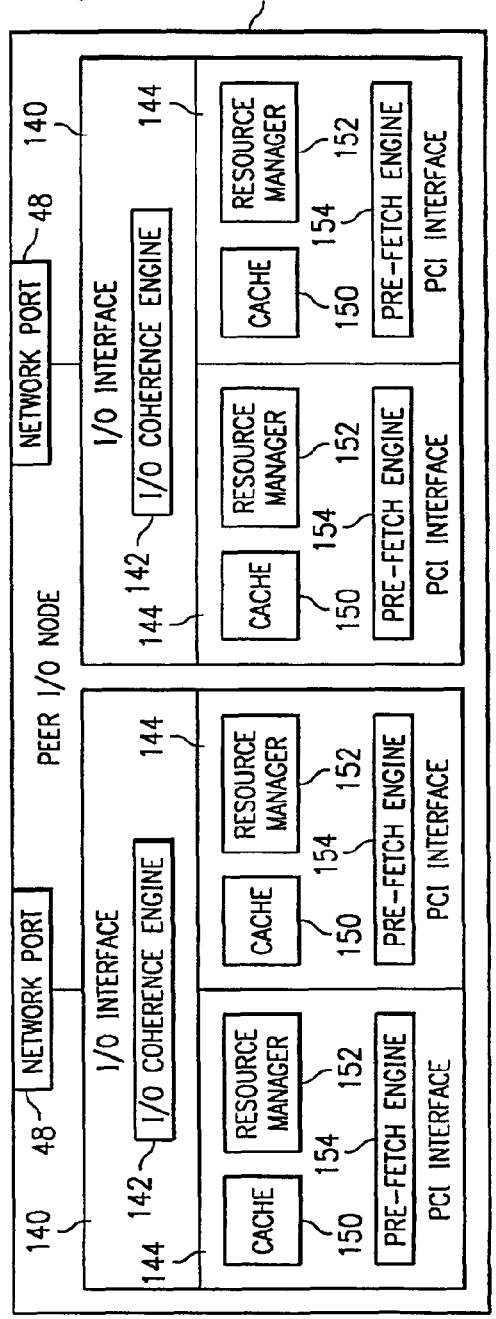

| Group | | Name | Description |
|---|---|---|---|
| READ (910) | SHARED (910a) | READ | READ |
| | | RDSHD | READ SHARED |
| | EXCLUSIVE (910b) | RDEXC | READ EXCLUSIVE |
| | | RDXRO | EXCLUSIVE READ-ONLY TIMED |
| | | RDXRN | EXCLUSIVE READ-ONLY UNTIMED |
| | GET (910c) | GET | READ INVALID |
| | | GETF | READ INVALID, FORCED |
| | etc. (910d) | AMOR | ATOMIC MEMORY OPERATION, READ |
| | | NCRD | NON-COHERENT READ |
| WRITE (912) | WRITEBACK (912a) | WRBK | WRITEBACK |
| | | WRBKR | WRITEBACK, CONCURRENT READ OUTSTANDING |
| | | IWE | IMPLICIT WRITEBACK EXCLUSIVE |
| | | RQSH | CEX DROP (RELINQUISH) |
| | | RQSHR | CEX DROP, CONCURRENT READ OUTSTANDING |
| | PUT (912b) | PUT | WRITE INVALIDATE |
| | | PFCL | CACHE LINE FLUSH |
| | ETC. (912c) | AMOW | ATOMIC MEMORY OPERATION, WRITE |
| | | NCWRD | NON-COHERENT WRITE, DOUBLEWORD |
| | | NCWRF | NON-COHERENT WRITE, CACHE LINE |
| PROBE (914) | SHARED (914a) | INTER | INTERVENTION SHARED |
| | EXCLUSIVE (914b) | INEXC | INTERVENTION EXCLUSIVE |
| | | FLSH | FLUSH |
| | | ERASE | ERASE |
| | GET (914c) | ININV | INTERVENTION INVALID |
| | | ININF | INTERVENTION INVALID, FORCED |
| | ETC. (914d) | INVAL | INVALIDATE |
| INVAL GENERATION (916) | | BINEV | BACKOFF INVALIDATE ECHO, VECTOR FORMAT |
| | | LINVV | LOCAL BLOCK INVALIDATE VECTOR |

| Group | | Name | Description |
|---|---|---|---|
| READ | SHARED | SRPLY | SHARED REPLY |
| | | SRESP | SHARED RESPONSE |
| | | SACK | SHARED ACKNOWLEDGE |
| | | BINTR | BACKOFF INTERVENTION SHARED |
| | EXCLUSIVE | ERPLY | EXCLUSIVE REPLY |
| | | ESPEC | EXCLUSIVE SPECULATIVE REPLY |
| | | ERESP | EXCLUSIVE RESPONSE |
| | | EACK | EXCLUSIVE ACKNOWLEDGE |
| | | ERPYP | EXCLUSIVE REPLY, SEND PRGE |
| | | BIEXC | BACKOFF INTERVENTION EXCLUSIVE |
| | | BINVV | BACKOFF INVALIDATE, VECTOR FORMAT |
| | | BINVP | BACKOFF INVALIDATE, POINTER FORMAT |
| | GET | IRPLY | INVALID REPLY |
| | | ISPEC | INVALID SPECULATIVE REPLY |
| | | IRESP | INVALID RESPONSE |
| | | IACK | INVALID ACKNOWLEDGE |
| | | NACKG | NEGATIVE ACKNOWLEDGE TO GET |
| | | BIINV | BACKOFF INTERVENTION INVALID |
| | | BIINF | BACKOFF INTERVENTION INVALID FORCED |
| | ETC. | AARP | AMO READ REPLY |
| | | NCRP | NON-COHERENT READ REPLY |
| | | NACK | COHERENT READ NEGATIVE ACKNOWLEDGE |
| WRITE | WRITEBACK | WBACK | WRITEBACK ACKNOWLEDGE |
| | | WBBACK | WRITEBACK BUSY ACKNOWLEDGE |
| | PUT | WACK | WRITE INVALIDATE ACKNOWLEDGE |
| | | WACKP | WRITE INVALIDATE ACK, SEND PRGE |
| | | WNACK | WRITE INVALIDATE NEGATIVE ACKNOWLEDGE |

FROM FIG. 10A

| | | | |
|---|---|---|---|
| WRITE | PUT | BFLSH | BACKOFF FLUSH |
| | | BERSE | BACKOFF ERASE |
| | ETC. | AWAK | AMO WRITE ACKNOWLEDGE |
| | | NCWAK | NON-COHERENT WRITE ACKNOWLEDGE |
| PROBE | SHARED | SHWB | SHARING WRITEBACK |
| | | DNGRD | DOWNGRADE |
| | | SHWBR | SHARING WRITEBACK, PRIOR WB PENDING |
| | | DNGDR | DOWNGRADE WITH PRIOR WB PENDING |
| | EXCLUSIVE | PRGE | PURGE |
| | | XFER | OWNERSHIP TRANSFER |
| | | PRGER | PURGE WITH PRIOR WB PENDING |
| | | XFERR | OWNERSHIP TRANSFER, PRIOR WB PENDING |
| | | IWACK | IMPLICIT WRITEBACK RACE ACKNOWLEDGE |
| | GET | IIACK | INTERVENTION INVALID ACK |
| | ETC. | IVACK | INVALIDATE ACK |
| ERROR | | PERR | POISONED ACCESS ERROR |
| | | AERR | READ PROTECTION VIOLATION ERROR |
| | | WERR | WRITE PROTECTION VIOLATION ERROR |
| | | DERRR | DIRECTORY ERROR ON A READ REQUEST |
| | | DERRW | DIRECTORY ERROR ON A WRITE REQUEST |

1000, 1012, 1012b, 1012c, 1014, 1014a, 1014b, 1014c, 1014d, 1016

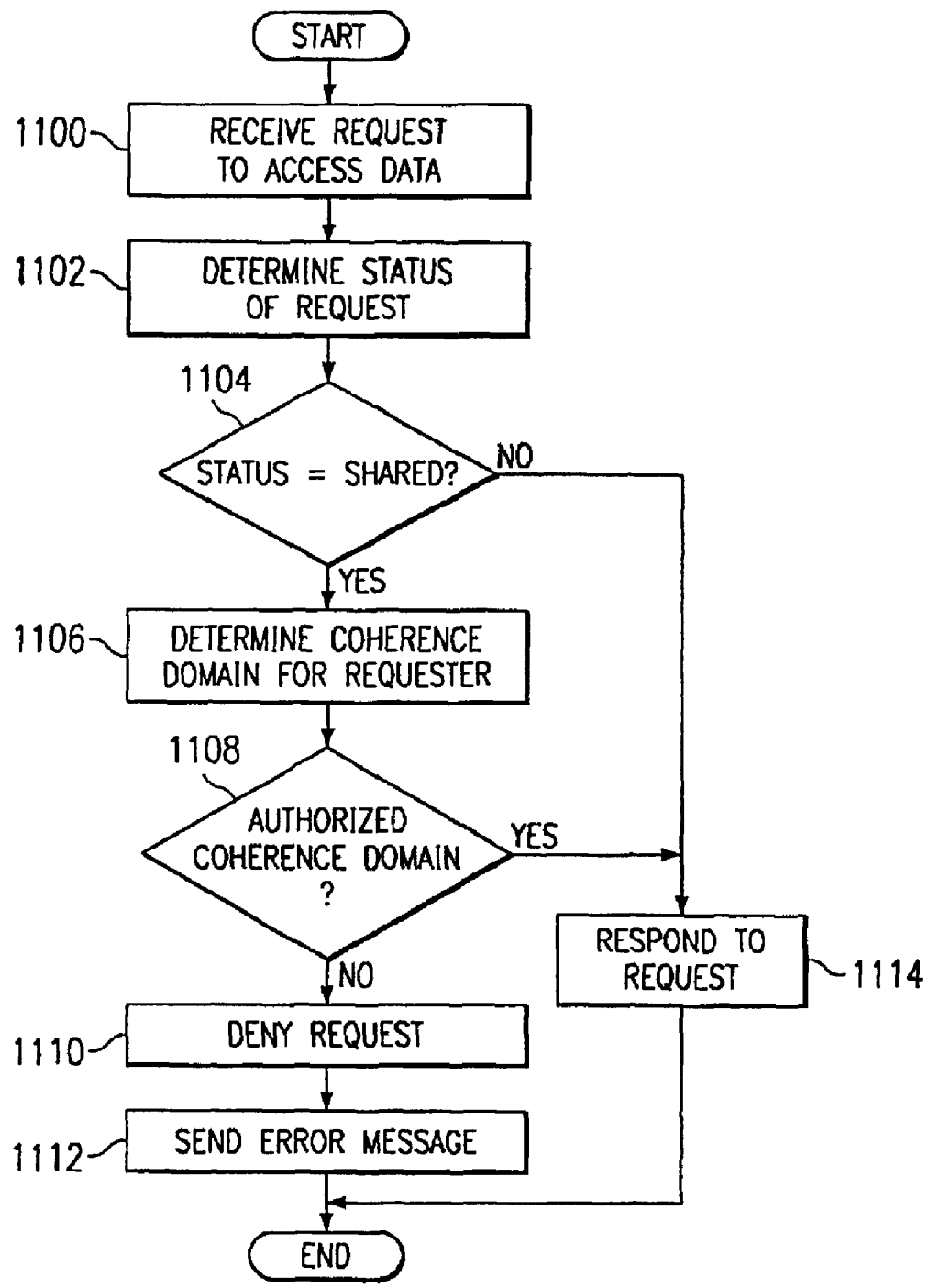

PROVIDING SHARED AND NON-SHARED ACCESS TO MEMORY IN A SYSTEM WITH PLURAL PROCESSOR COHERENCE DOMAINS

RELATED APPLICATIONS

This application claims the benefit of U.S. Provisional Application Ser. No. 60/219,950 filed Jul. 20, 2000.

TECHNICAL FIELD OF THE INVENTION

This invention relates generally to the field of multiprocessor systems, and more particularly to a method and system for managing memory in a multiprocessor system.

BACKGROUND OF THE INVENTION

Multiprocessor computers often include a large number of computer processors that may operate in parallel. Parallel processing computer architectures include cache-coherent multiprocessors with non-uniform memory access (NUMA) architecture. NUMA architecture refers to a multiprocessor system in which each processor has its own local memory that can also be accessed by the other processors in the system. NUMA architecture is non-uniform in that memory access times are faster for a processor accessing its own local memory than for a processor accessing memory local to another processor.

In order to maintain cache coherence and protect memory pages from unauthorized access, a protection scheme is generally used to enable or disable shared access to a memory page. A memory page may include data, as well as a directory for tracking states associated with cache lines for the memory page. Conventional memory protection schemes utilize memory protection codes to indicate whether a particular element may access the memory page.

For non-shared access to a cache line, the memory protection code simply has to track the single element with access to the cache line. However, for shared access to a cache line, the memory protection code has to track all the elements with access to the cache line in order to notify those elements when their copies of the cache line have been invalidated. Thus, for a memory protection code of a specific size, a fixed number of elements may be tracked, limiting the number of elements that may share access to a cache line.

Conventional systems have attempted to solve this problem by using aliased elements. This approach has the memory protection code tracking a number of elements together such that when one element has shared access to a cache line, the memory protection code indicates that multiple elements have shared copies of the cache line. However, as the number of aliased elements increases, the efficiency of the system is reduced in that a greater number of elements that are not actually storing a copy of the cache line must be notified of modifications to the cache line.

SUMMARY OF THE INVENTION

The present invention provides a method and system for managing memory in a multiprocessor system that significantly reduce or eliminate problems and disadvantages associated with previous systems and methods. In particular, the system is divided into a number of processor domains with shared access provided only within each processor domain and non-shared access provided across processor domains.

In accordance with one embodiment of the present invention, a method and system for managing memory in a multiprocessor system includes defining a plurality of processor coherence domains within a system coherence domain of the multiprocessor system. The processor coherence domains each include a plurality of processors and a processor memory. Shared access to data in the processor memory of each processor coherence domain is provided only to elements of the multiprocessor system within the processor coherence domain. Non-shared access to data in the processor memory of each processor coherence domain is provided to elements of the multiprocessor system within and outside of the processor coherence domain.

More specifically, in accordance with a particular embodiment of the present invention, a limited sharing vector is provided for each processor memory. The limited sharing vector is operable to identify only processors within the processor coherence domain. In this embodiment, the sharing vector may be 32 bits in size for a multiprocessor system having more than 512 processors.

Technical advantages of the present invention include providing an improved multiprocessor system. In particular, processor domains are defined in the system with shared cacheable access allowed only within processor domains. As a result, the multiprocessor system may be scaled without enlarging the sharing vectors or degrading granularity of the sharing vectors.

Another technical advantage of the present invention includes providing an approved method and system for managing memory in a multiprocessor system. In particular, memory is managed with minimum resources by using a limited sharing vector and dividing the system into sharing domains. Accordingly, memory resources are reduced without degrading functionality of the system, using course sharing vectors or requiring input/output (I/O) transfers.

Other technical advantages of the present invention will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like numerals represent like parts, in which:

FIG. 4 is a block diagram illustrating details of a processor node of FIG. 2 in accordance with one embodiment of the present invention;

FIG. 7 is a block diagram illustrating details of a peer I/O node of FIG. 2 in accordance with one embodiment of the present invention;

FIG. 9 is a table illustrating operations operable to be requested by elements of the multiprocessor system of FIG. 2 in accordance with one embodiment of the present invention;

FIG. 10A-B is a table illustrating operations operable to be performed by elements of the multiprocessor system of FIG. 2 in response to the requests of FIG. 9 in accordance with one embodiment of the present invention; and FIG. 11 is a flow diagram illustrating a method for sharing data in a system with multiprocessor coherence domains, such as the system illustrated in FIGS. 2 and 8.

DETAILED DESCRIPTION OF THE INVENTION

Figure 1:
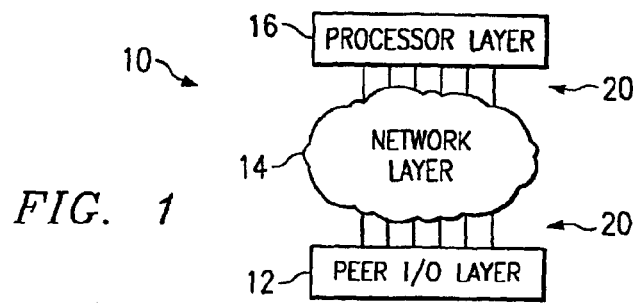
FIG. 1 is a block diagram illustrating a multiprocessor system for providing a peer input/output (I/O) layer in accordance with one embodiment of the present invention.

FIG. 1 is a block diagram illustrating a multiprocessor system 10 in accordance with one embodiment of the present invention. In this embodiment, the system 10 is fully scalable in both the processor and input/output (I/O) direction. Accordingly, the system 10 may be readily adapted to any suitable environment.

The system 10 comprises a peer I/O layer 12, a network layer 14 and a processor layer 16. The peer I/O layer 12, or I/O sub-system, is a peer layer in that it may communicate with the network layer 14 in the same manner as the processor layer 16, or processing sub-system. The network layer 14 couples the peer I/O layer 12 to the processor layer 16 such that the processor layer 16 may communicate with the peer I/O layer 12. Each layer 12 and 16 is coupled to the network layer 14 through communications lines 20. As used herein, "each" means every one of at least a subset of the identified items. The communication lines 20 may be any suitable wireline or wireless communication link capable of supporting data transfer.

Figure 2:
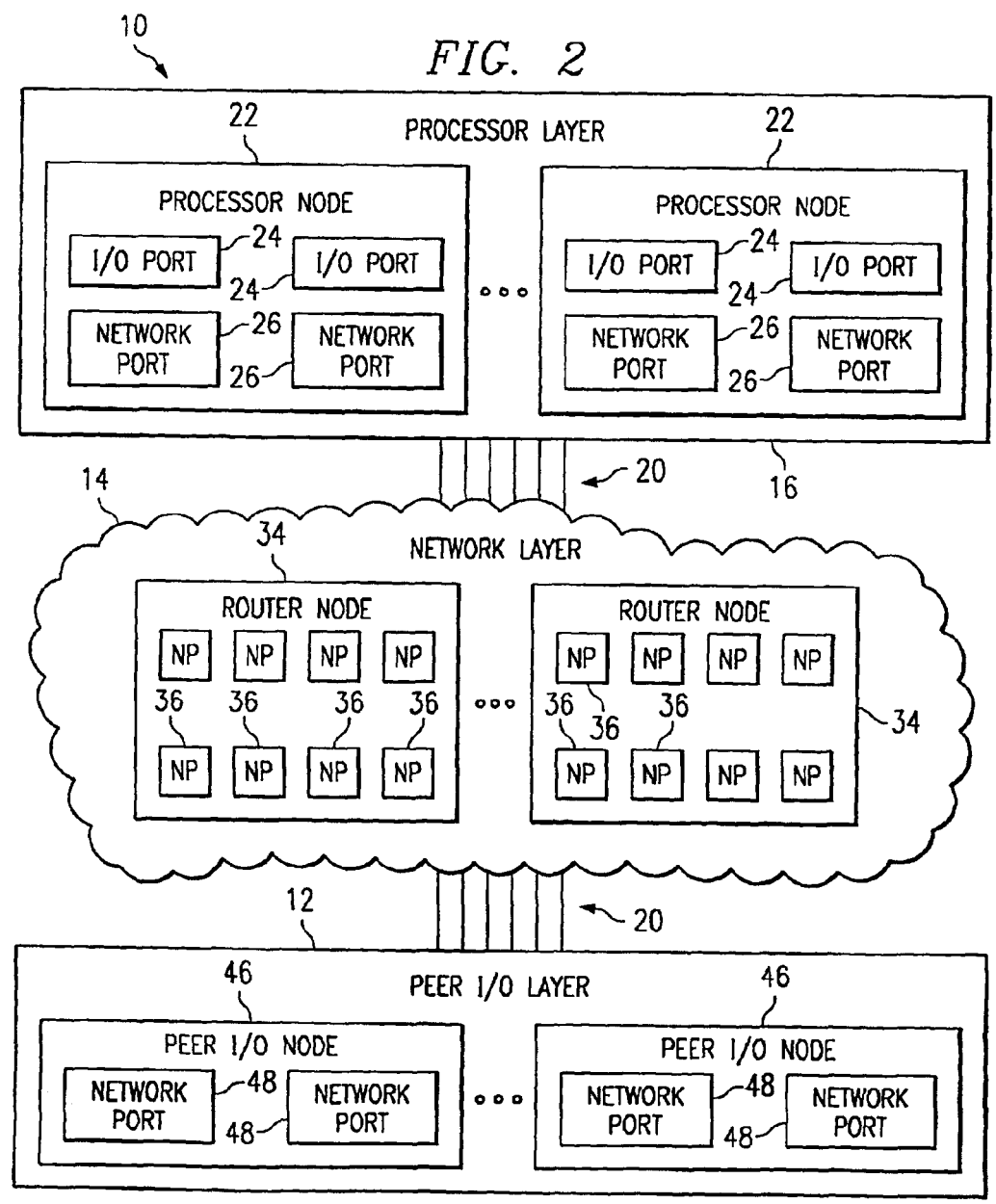
FIG. 2 is a block diagram illustrating details of the multiprocessor system of FIG. 1.

FIG. 2 is a block diagram illustrating details of the multiprocessor system 10. The processor layer 16 comprises a plurality of processor nodes 22. According to one embodiment, each processor node 22 comprises two I/O ports 24 and two network ports 26. Each I/O port 24 is operable to provide communication between the processor node 22 and a peripheral device such as a tape, disk, network or any other suitable peripheral device. Each network port 26 is operable to provide communication between the processor node 22 and the network layer 14 through the communication lines 20. In accordance with one embodiment, the network ports 26 comprise non-uniform memory access (NUMA) ports.

The network layer 14 comprises a plurality of router nodes 34. Each router node 34 comprises a plurality of network ports 36 for communicating with the processor layer 16 and/or the peer I/O layer 12. According to one embodiment, each network port 36 comprises a NUMA port.

The peer I/O layer comprises a plurality of peer I/O nodes 46. According to one embodiment, each peer I/O node 46 comprises two network ports 48. Each network port 48 is operable to provide communication between the peer I/O node 46 and the network layer 14. In accordance with one embodiment, each network port 48 comprises a NUMA port.

Each of the network ports 26, 36 and 48 are operable to provide communication between the corresponding node 22, 34, or 46 and any other node 22, 34 or 46. Thus, for example, the I/O nodes 46 may communicate with each other through their network ports 48 without an intervening router node 34.

Figure 3:
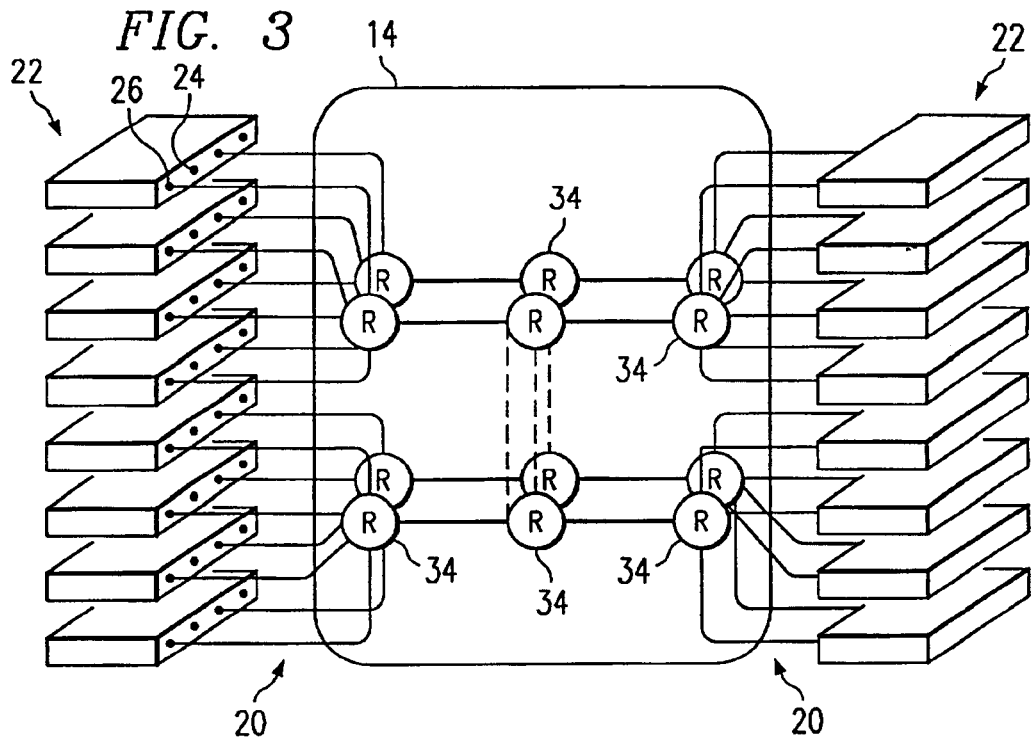
FIG. 3 is a block diagram illustrating the interconnection of router nodes of FIG. 2 in accordance with one embodiment of the present invention.

FIG. 3 is a block diagram illustrating the interconnection of router nodes 34 in accordance with one embodiment of the present invention. In this embodiment, each network port 26 of each processor node 22 is coupled to a network port 36 of a router node 34 by a communication line 20. The router nodes 34 which are coupled to the network ports 26 may also be coupled to other router nodes 34. For this embodiment, a network port 36 of one router node 34 is coupled by a communication line 20 to a network port 36 of another router node 34. In this way, a network layer 14 may be formed that allows communication between processor nodes 22 and peer I/O nodes 46 (not shown in FIG. 3). For example, a router node 34 may be coupled to processor nodes 22, I/O nodes 46 and/or other router nodes 34, each of which may be coupled to additional processor nodes 22, I/O nodes 46 and/or other router nodes 34. Thus, a network layer 14 may be formed to provide communication between any suitable combination of processor nodes 22 and I/O nodes 46.

FIG. 4 is a block diagram illustrating details of a processor node 22. In addition to the I/O ports 24 and network ports 26, the illustrated processor node 22 comprises two superhubs (SHUBS) 70. It will be understood, however, that a processor node 22 may comprise any suitable number of SHUBs 70 or other suitable multiprocessor sub-systems without departing from the scope of the present invention. In accordance with the illustrated embodiment, each SHUB 70 is coupled to a processor memory 72 and a pair of processors 74. Collectively, the memories 72 of the system 10 form a processor memory system. However, it will be understood that the processor memory system may comprise any one or more of the memories 72 without departing from the scope of the present invention.

The SHUB 70 comprises a memory interface 80 for communicating with the memory 72. The memory 72 comprises data 82, as well as a directory 84 for managing access to the data 82. The memory 72 is accessed through the memory interface 80 over line 86. According to one embodiment, the line 86 may communicate data between the memory 72 and the memory interface 80 at a rate of approximately 10 gigabytes per second.

The SHUB 70 also comprises a processor interface for communicating with the processors 74 over line 92. Although the illustrated embodiment comprises two processors 74 for each SHUB 70, it will be understood that any suitable number of processors 74 may be coupled to each SHUB 70 without departing from the scope of the present invention.

The SHUB 70 further comprises a network crossbar 100. The network crossbar 100 comprises a local block 102 for performing miscellaneous functions such as providing a global clock, maintenance features, and other administrative functions, an I/O interface 104 for providing communication between the SHUB 70 and an I/O port 24, and a network interface 106 for providing communication between the SHUB 70 and a network port 26. The network crossbar 100 is operable to provide communication between the components of the SHUB 70 and the network interface 106.

The I/O interface 104 may communicate with the I/O port 24 over line 110. According to one embodiment, communication may be provided over line 110 at a rate of approximately 1.2 gigabytes per second. The network interface 106 may communicate with a network port 26 over line 120. In addition, as illustrated in FIG. 4, the network interfaces 106 of the two SHUBs 70 may communicate with each other over line 120. According to one embodiment, the lines 120 comprise NUMA links and provide communication at a rate of approximately 1.6 gigabytes per second or 3.2 gigabytes per second.

Figure 5:
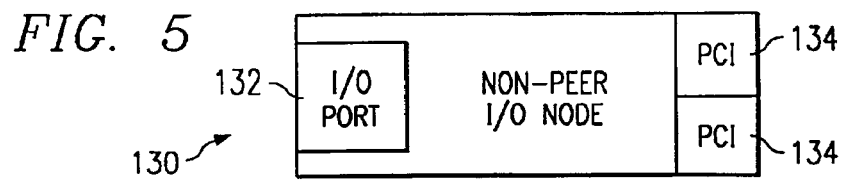
FIG. 5 is a block diagram illustrating a non-peer I/O node for use with the system of FIG. 2 in accordance with one embodiment of the present invention.

FIG. 5 is a block diagram illustrating a non-peer I/O node 130 for use with the system 10. The non-peer I/O node 130 is operable to provide communication between an I/O port 24 of a processor node 22 and a peripheral device. The non-peer I/O node 130 comprises an I/O port 132 for coupling the non-peer I/O node 130 to the I/O port 24 of the processor node 22. The illustrated non-peer I/O node 130 also comprises two peripheral component interfaces (PCIs) 134 or other suitable interfaces. It will be understood, however, that a non-peer I/O node 130 may comprise any suitable number of PCIs 134 without departing from the scope of the present invention. Each PCI 134 may provide communication between the non-peer I/O node 130 and a peripheral device such as a tape, disk, network or other suitable peripheral device.

Figure 6:
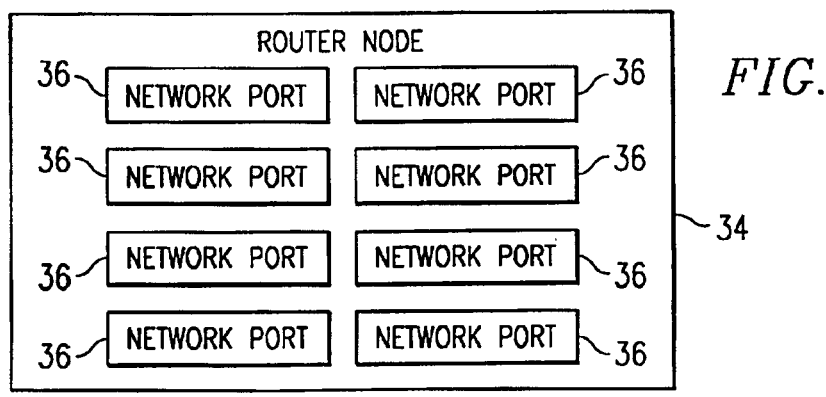
FIG. 6 is a block diagram illustrating details of a router node of FIG. 2 in accordance with one embodiment of the present invention.

FIG. 6 is a block diagram illustrating details of a router node 34. In accordance with the illustrated embodiment, each router node 34 comprises eight network ports 36. However, it will be understood that a router node 34 may comprise any suitable number of network ports 36 without departing from the scope of the present invention. The network ports 36 each comprise a NUMA port that is operable to provide communication between the router node 34 and a processor node 22 through a network port 26 of the processor node 22, between the router node 34 and a peer I/O node 46 through a network port 48 of the peer I/O node 46 or between the router node 34 and another router node 34 through a network port 36 of the other router node 34. Thus, as described in more detail above in connection with FIG. 3, for the embodiment in which the router node 34 comprises eight network ports 36, any suitable combination of up to eight processor nodes 22, peer I/O nodes 46 and/or router nodes 34 may be coupled together through a router node 34 by the network ports 36.

FIG. 7 is a block diagram illustrating details of a peer I/O node 46. In addition to the network ports 48, the I/O node 46 comprises an I/O interface 140 corresponding to each network port 48. Each I/O interface 140 comprises an I/O coherence engine 142 and a PCI or other suitable interface 144. The I/O coherence engine 142 is operable to communicate with the processor layer 16 using a distributed memory protocol to retrieve copies of requested data. The system 10 comprises a distributed memory comprising the memories 72 of the processor nodes 22 and the caches 150 of the I/O nodes 46. The distributed memory protocol allows the system 10 to maintain the reliability of the data in the distributed memory. The I/O coherence engine 142 may comprise logic stored in a computer-processable medium. The logic may be encoded in hardware and/or software instructions stored in RAM, ROM and/or other suitable computer-processable media.

The PCI interface 144 comprises a memory such as a cache 150, a resource manager 152, and a pre-fetch engine 154. The cache 150, which comprises any suitable data store, is operable to cache coherent data for the corresponding peripheral device, as described in more detail below in connection with FIG. 8. The resource manager 152 is operable to invalidate data in the cache 150 that has expired or that has been designated as invalid by a processor node 22. Invalidating data comprises deleting the data, writing over the data or otherwise preventing future use of the data. The resource manager 152 may comprise logic stored in a computer-processable medium. The pre-fetch engine 154 is operable to identify data to pre-fetch and pre-fetch the identified data for storage in the cache 150 for the benefit of the corresponding peripheral device. The pre-fetch engine 154 may also comprise logic stored in a computer-processable medium.

The PCI interface 144 is operable to provide communication between the I/O node 46 and a peripheral device. Thus, each I/O node 46 may communicate with a router node 34 in the same manner that a processor node 22 communicates with a router node 34 and may also communicate with any suitable peripheral device through the PCI interface 144. In this way, communication may be provided between any processor node 22 and any peripheral device.

Figure 8:
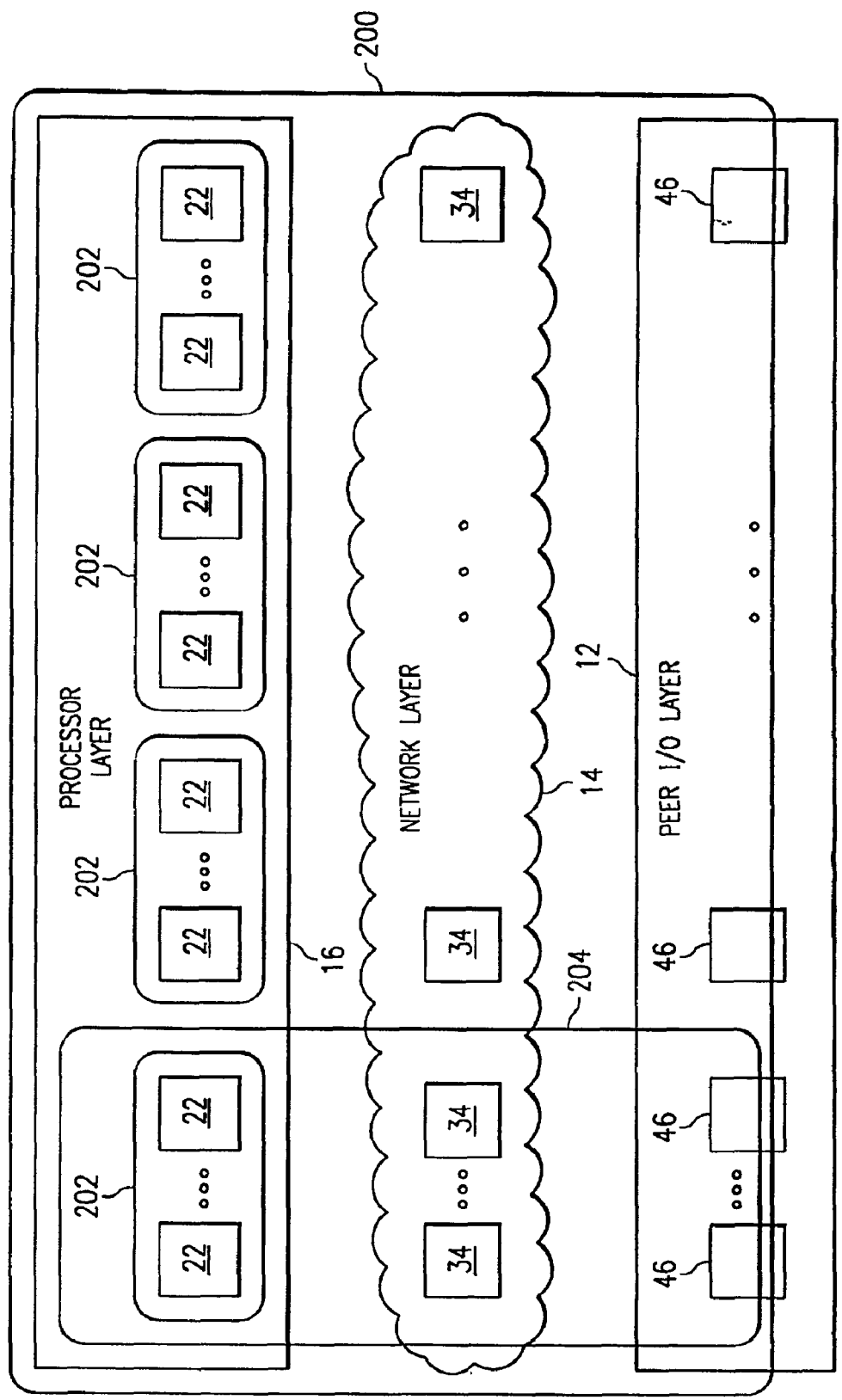
FIG. 8 is a block diagram illustrating coherence domains for the multiprocessor system of FIG. 2 in accordance with one embodiment of the present invention.

FIG. 8 is a block diagram illustrating coherence domains 200, 202, 204 for the multiprocessor system 10. The coherence domains comprise a system coherence domain 200, a plurality of processor coherence domains 202, and a plurality of partition coherence domains 204. Data sharing is provided between elements of the system 10 based on the coherence domains 200, 202 and 204 in which the elements exist.

The system coherence domain 200 comprises the processor layer 16, the network layer 14 and a portion of the peer I/O layer 12. The system coherence domain 200 comprises each cache 150 in each I/O node 46 in the peer I/O layer 12. Thus, as described below, each I/O node 46 is operable to cache coherent data from any memory 72 of any processor node 22 in the system 10.

The directory 84 for each memory 72 in a processor node 22 comprises information relating to a status for each cache line of data 82. A cache line of data 82 may comprise 128 bytes or any other suitable amount of data 82. In accordance with the distributed memory protocol of the present invention, the status may comprise free, shared, exclusive, exclusive read-only untimed, exclusive read-only timed, or other suitable status.

A status of free indicates that the corresponding data 82 is unowned, with no elements of the system 10 storing a copy of the data 82. A status of shared indicates that copies of the corresponding data 82 are currently stored in other elements of the system 10. Thus, if data 82 with a status of shared is modified, the memory 72 notifies each element with a copy of the data 82 to invalidate the stored copy. A status of exclusive indicates that the corresponding data 82 is owned by a particular element of the system 10 such that the element may read from and write to the cache line in the memory 72 that comprises the data 82, while no other elements of the system 10 are permitted to receive a copy of the data 82.

A status of exclusive read-only untimed indicates that the corresponding data 82 is owned by an I/O node 46. The I/O node 46 has an exclusive copy of the cache line in that no other copies are permitted to be transmitted to other elements of the system 10 while the data 82 has a status of exclusive read-only untimed. However, the data 82 is also read-only in that the I/O node 46 has access to read the cache line but does not have access to write to the cache line.

A status of exclusive read-only timed is similar to a status of exclusive read-only untimed, with the I/O node 46 having access only to read the cache line and no other components of the system 10 having access to the cache line. However, data 82 with a status of exclusive read-only timed is updated to a status of free once a predefined period of time has passed after an initiation event that designates the data 82 as exclusive read-only timed.

Thus, the I/O node 46 has transient access to the cache line for the predefined period of time, after which the memory 72 changes the status in the directory 84 to free and the resource manager 152 invalidates the copy of the data 82 in the cache 150. This allows the sending of messages back and forth to invalidate the data in the cache 150 to be avoided in most situations, resulting in a significant decrease in wasted bandwidth.

According to one embodiment, the initiation event designating the data 82 as exclusive read-only timed may be the request for access to the data by the I/O node 46. The I/O node 46 may store a time-stamp associated with the request time. The data in the cache 150 would then be considered reliable until the predefined period of time passed after the request time. The I/O node 46 may transmit this request time to the memory 72 such that the memory 72 may determine that the data in the cache 150 has become unreliable at substantially the same time as the I/O node 46. Alternatively, the memory 72 may store a time-stamp associated with the response time, using the response time as an initiation event. In this situation, the memory 72 would determine that the data in the cache 150 had become unreliable at a later time than the I/O node 46.

The use of the exclusive read-only statuses for I/O nodes 46, therefore, allows I/O nodes 46 to cache coherent data without affecting the number of processor nodes 22 that may be tracked by a sharing vector. A sharing vector tracks the location of shared copies of data 82. Because the I/O nodes 46 have exclusive, as opposed to shared, access to the data 82, an unlimited number of I/O nodes 46 may be included in the system coherence domain 200 regardless of the size of the sharing vector.

The processor coherence domains 202 comprise processor nodes 22 that may coherently share data. According to one embodiment, each processor coherence domain 202 comprises 128 processor nodes 22. It will be understood, however, that a processor coherence domain 202 may comprise any suitable number of processor nodes 22 without departing from the scope of the present invention. Each processor coherence domain 202 comprises a sharing vector independent of the other processor coherence domains 202. In order to keep track of an increased number of processor nodes 22 without increasing the size of the sharing vector, aliasing of processor nodes 22 may be used by the sharing vector.

For example, the sharing vector may indicate that four processor nodes 22 have shared copies of a cache line when only one of the processor nodes 22 actually has a copy of the cache line. In this situation, the sharing vector would track one sharing processor node 22 with a copy of the data 82 and three aliased processor nodes 22 without copies of the data 82. It will be understood, however, that the sharing vector may track any suitable number of aliased processor nodes 22 in addition to each sharing processor node 22 without departing from the scope of the present invention.

Using aliased processor nodes 22 allows more processor nodes 22 in general to be tracked by a sharing vector that is limited in size. However, as the number of aliased nodes 22 increases, the efficiency of the system 10 is reduced in that a greater number of processor nodes 22 that are not storing a copy of the data 82 must be notified of modifications to the data 82. Thus, the system 10 comprises multiprocessor coherence domains 202 each having its own sharing vector. In this way, the system may comprise an increased number of processor nodes 22 without a corresponding increase in aliasing by the sharing vector. According to one embodiment, the sharing vector may be 32 bits in size for a multiprocessor system having more than 512 processors 74. For the illustrated embodiment comprising four processor coherence domains 202, the sharing vector may be 32 bits in size and support 2,048 processors 74.

In this embodiment, therefore, processor nodes 22 within a same processor coherence domain 202 may share copies of a cache line with each other. In addition, any processor node 22 in the system 10 may obtain an exclusive copy of a cache line from any other processor node 22 in the system 10 regardless of whether or not they are in the same processor coherence domain 202. Each processor node 22 may comprise an identifier to indicate in which processor coherence domain 202 the processor node 22 exists. Upon requesting shared access to data, a processor node 22 may provide its identifier along with or as part of the request. According to one embodiment, a specified number of the most significant bits of the identifier may identify the processor coherence domain 202.

In accordance with an alternative embodiment of the present invention, processor nodes 22 in one processor coherence domain 202 may share copies of data 82 in the memory 72 of another processor coherence domain 202. For this embodiment, processor nodes 22 in other processor coherence domains 202, including the processor coherence domain 202 comprising the processor node 22 storing the data 82, may have exclusive copies of the data 82 but may not share copies.

The partition coherence domains 204, only one of which is illustrated in FIG. 8, comprise a plurality of processor nodes 22, a plurality of router nodes 34 and a portion of each of a plurality of peer I/O nodes 46. The portion of each I/O node 46 in the partition coherence domain 204 comprises each cache 150 in the I/O node 46.

According to one embodiment, partition coherence domains 204 comprise elements of the system 10 that may operate on an operating system that is independent of operating systems for the other partition coherence domains 204. This type of coherence domain 204 provides error containment for operating system references.

According to one embodiment, each partition coherence domain 204 comprises 128 processor nodes 22, in addition to a plurality of router nodes 34 and I/O nodes 46. It will be understood, however, that the partition coherence domains 204 may comprise any suitable number of nodes 22, 34, and 46 and that each partition coherence domain 204 may comprise a different number of nodes 22, 34 and 46.

FIG. 9 is a request table 900 illustrating operations operable to be requested by elements of the multiprocessor system 10 in accordance with one embodiment of the present invention. The request table 900 comprises a group column 902, a name column 904, and a description column 906. The groups 902 comprise a read group 910, a write group 912, a probe group 914, and an invalidate group 916.

The read group 910 comprises a shared sub-group 910a, an exclusive sub-group 910b, a get sub-group 910c and a miscellaneous sub-group 910d. The write group 912 comprises a write-back sub-group 912a, a put sub-group 912b and a miscellaneous sub-group 912c. The probe group 914 comprises a shared sub-group 914a, an exclusive sub-group 914b, a get sub-group 914c and a miscellaneous sub-group 914d.

FIG. 10A-B is a response table 1000 illustrating operations operable to be performed by elements of the multiprocessor system 10 in response to the requests illustrated in the request table 900 in accordance with one embodiment of the present invention. The response table 1000 comprises a group column 1002, a name column 1004, and a description column 1006. The group column 1002 comprises a read group 1010, a write group 1012, a probe group 1014, and an error group 1016. The read group 1010 comprises a shared sub-group 1010a, an exclusive sub-group 1010b, a get sub-group 1010c, and a miscellaneous sub-group 1010d.

The write group 1012 comprises a write-back sub-group 1012a, a put sub-group 1012b, and a miscellaneous sub-group 1012c. The probe group 1014 comprises a shared sub-group 1014a, an exclusive sub-group 1014b, a get sub-group 1014c, and a miscellaneous sub-group 1014d.

FIG. 11 is a flow diagram illustrating a method for sharing data in a system with multiprocessor coherence domains 202. The method begins at step 1100 where a processor node 22 receives a request to access data 82 in the system memory 72. At step 1102, the processor node 22 determines the status of the request. At decisional step 1104, a determination is made regarding whether the status of the request is shared. If the status of the request is shared, the method follows the Yes branch from decisional step 1104 to step 1106. At step 1106, the processor node 22 determines in which processor coherence domain 202 the processor node 22 requesting the data 82 exists.

At decisional step 1108, a determination is made regarding whether the identified processor coherence domain 202 is authorized to share the requested data 82. If the processor coherence domain 202 is not authorized to share the requested data 82, the method follows the No branch from decisional step 1108 to step 1110. At step 1110, the processor node 22 denies the request to access the data 82. At step 1112, the processor node 22 transmits an error message to the requesting processor node 22 to indicate that the request has been denied, at which point the method comes to an end.

Returning to decisional step 1104, if the status of the request is not shared, the method follows the No branch from decisional step 1104 to step 1114. In addition, returning to decisional step 1108, if the processor coherence domain 202 is authorized to share the requested data 82, the method follows the Yes branch from decisional step 1108 to step 1114. At step 1114, the processor node 22 responds to the request for the data 82, at which point the method comes to an end.

Although the present invention has been described with several embodiments, various changes and modifications may be suggested to one skilled in the art. It is intended that the present invention encompasses such changes and modifications as fall within the scope of the appended claims.

What is claimed is:

1. A method for managing memory in a multiprocessor system, comprising:
   defining a plurality of processor coherence domains within a system coherence domain of a multiprocessor system, the processor coherence domains each including a plurality of processors and a processor memory;
   providing shared access to data in the processor memory of each processor coherence domain only to elements of the multiprocessor system within the processor coherence domain;
   providing non-shared access to data in the processor memory of each processor coherence domain to elements of the multiprocessor system within and outside of the processor coherence domain;
   defining a plurality of partition coherence domains within the system coherence domain of the multiprocessor system, each partition coherence domain including at least one processor coherence domain, a router node, and a peer input/output node, each partition coherence domain providing memory coherence for its respective processor coherence domain, router node, and peer input/output node.

2. The method of claim 1, the non-shared access comprising read-only access.

3. The method of claim 1, the non-shared access comprising exclusive access.

4. The method of claim 1, the non-shared access comprising transient access.

5. A method for managing memory in a multiprocessor system, comprising:
   defining a plurality of processor coherence domains within a system coherence domain of a multiprocessor system, the processor coherence domains each including a plurality of processors and a processor memory;
   providing shared access to data in the processor memory of each processor coherence domain only to elements of the multiprocessor system within the processor coherence domain; and
   providing non-shared access to data in the processor memory of each processor coherence domain to elements of the multiprocessor system within and outside of the processor coherence domain;
   providing a limited sharing vector for each processor memory, the limited sharing vector operable to identify only a portion of processors in the multiprocessor system.

6. The method of claim 5, the limited sharing vectors each operable to identify processors only within their processor coherence domain.

7. The method of claim 5, wherein each sharing vector comprises 32 bits and the multiprocessor system comprises more than 512 processors.

8. A method for managing memory in a multiprocessor system, comprising:
   defining a plurality of processor coherence domains within a system coherence domain of a multiprocessor system, the processor coherence domains each including a plurality of processors and a processor memory;
   providing shared access to data in the processor memory of each processor coherence domain only to elements of the multiprocessor system within the processor coherence domain; and
   providing non-shared access to data in the processor memory of each processor coherence domain to elements of the multiprocessor system within and outside of the processor coherence domain;
   determining whether an element requesting shared access to a processor memory is outside of the processor coherence domain of the processor memory; and
   denying shared access if the element is outside of the processor coherence domain.

9. The method of claim 8, wherein each processor and processor memory comprises an identifier having a set of most significant bits identifying the processor coherence domain of the element, further comprising determining whether the element requesting shared access is outside of the processor coherence domain based on the most significant bits of the element.

10. The method of claim 9, further comprising determining whether the element requesting shared access is outside of the processor coherence domain of the processor memory by comparing the most significant bits of the identifier for the element to the most significant bits of the identifier for the processor memory.

11. A multiprocessor system for managing memory among a plurality of processors, comprising:
   a system coherence domain;
   plurality of processor coherence domains defined within the system coherence domain;

wherein the processor coherence domains each include a plurality of processors and a processor memory;

wherein the processor coherence domains are each operable to provide shared access to data in their processor memory only to elements of the multiprocessor system within the processor coherence domain and operable to provide non-shared access to data in their processor memory to elements within and outside of the processor coherence domain;

a plurality of partition coherence domains within the system coherence domain of the multiprocessor system, each partition coherence domain including at least one processor coherence domain, a router node, and a peer input/output node, each partition coherence domain providing memory coherence for its respective processor coherence domain, router node, and peer input/output node.

12. The multiprocessor system of claim 11, the non-shared access comprising read-only access.

13. The multiprocessor system of claim 11, the non-shared access comprising exclusive access.

14. The multiprocessor system of claim 11, the non-shared access comprising transient access.

15. The multiprocessor system of claim 11, the processor memory comprising a plurality of discrete memories.

16. A multiprocessor system for managing memory among a plurality of processors, comprising:

a system coherence domain;

plurality of processor coherence domains defined within the system coherence domain;

wherein the processor coherence domains each include a plurality of processors and a processor memory; and wherein the processor coherence domains are each operable to provide shared access to data in their processor memory only to elements of the multiprocessor system within the processor coherence domain and operable to provide non-shared access to data in their processor memory to elements within and outside of the processor coherence domain;

each processor memory further comprising:
a limited sharing vector for each data piece within the processor memory; and
the limited sharing vector operable to identity only a portion of processors in the multiprocessor system.

17. The multiprocessor system of claim 16, the limited sharing vectors each operable to identify only processors within their processor coherence domain.

18. The multiprocessor system of claim 16, wherein, the sharing each sharing vector comprises 32 bits and the multiprocessor system comprises more than 512 processors.

19. A multiprocessor system for managing memory among a plurality of processors, comprising:

a system coherence domain;

plurality of processor coherence domains defined within the system coherence domain;

wherein the processor coherence domains each include a plurality of processors and a processor memory; and wherein the processor coherence domains are each operable to provide shared access to data in their processor memory only to elements of the multiprocessor system within the processor coherence domain and operable to provide non-shared access to data in their processor memory to elements within and outside of the processor coherence domain;

each processor memory operable to determine whether an element requesting shared access is outside of the processor coherence domain of the processor memory and to deny shared access if the element is outside of the processor coherence domain.

20. The multiprocessor system of claim 19, wherein each element comprises an identifier and the processing coherence domain of each element is defined by a set of most significant bits of the identifier for the element, the processor memory further operable to determine whether an element requesting shared access is outside of the processor coherence domain based on the most significant bits of the element.

21. The multiprocessor system of claim 20, further comprising the processor memory operable to determine whether the element requesting shared access is outside of the processing coherence domain by comparing the most significant bits of the identifier for the processor memory to the most significant bits of the identifier for the element.

22. A method for managing processor memory in a scalable processor system, comprising:

receiving a request from an element for shared access to data in a processor memory;

determining whether the element is outside of a processor coherence domain of the processor memory; and denying the request for shared access if the element is outside of the processor coherence domain of the processor memory;

granting non-shared access to an element regardless of whether the element is within or outside of the processor coherence domain of the processor memory.

23. The method of claim 22, further comprising:

including an identifier for the element in the request for shared access;

determining whether the element is outside of the processor coherence domain of the processor memory based on the identifier in the request.

24. The method of claim 23, determining whether the element is outside of the processor coherence domain of the processor memory by comparing at least a portion of the identifier in the request to at least a portion of an identifier for the processor memory.

25. The method of claim 24, wherein the portion comprises a set of most significant bits.

26. A system for managing processor memory in a scalable processor system, comprising:

a computer processable medium; and logic stored on the computer processable medium, the logic operable to receive a request from an element for shared access to data in a processor memory, determine whether the element is outside of a processor coherence domain of the processor memory, and deny the request for shared access if the element is outside of the processor coherence domain of the processor memory, the logic further operable to grant non-shared access to an element regardless of whether the element is within or outside of the processor coherence domain of the processor memory.

27. The method of claim 26, wherein the request for shared access includes an identifier for the element, the logic further operable to determine whether the element is outside of the processor coherence domain of the processor memory based on the identifier in the request.

28. The system of claim 27, the logic further operable to determine whether the element is outside of the processor coherence domain of the processor memory by comparing at least a portion of the identifier in the request to at least a portion of an identifier for the processor memory.

29. The system of claim 28, wherein the portion comprises a set of most significant bits.

* * * * *